UNITED STATES PATENT OFFICE.

CHARLES FREDERICK CROSS, OF LONDON, ENGLAND.

MANUFACTURE OF SUGAR FROM CELLULOSE.

No. 807,250.  Specification of Letters Patent.  Patented Dec. 12, 1905.

Application filed January 30, 1905. Serial No. 243,415.

*To all whom it may concern:*

Be it known that I, CHARLES FREDERICK CROSS, a subject of the King of Great Britain, residing at 4 New Court, Carey street, London, England, have invented a certain new and useful Improved Manufacture of a Crystalline Sugar from a Form of Cellulose, of which the following is a specification.

My invention relates to the manufacture of a crystalline sugar from a form of cellulose or hemicellulose.

The sugar which I produce exhibits the properties of the pentoses and is probably xylose.

The form of cellulose which I use is characterized by its comparatively short cellular structure and by the ease with which it can be hydrolyzed to yield the sugar in question. One of the sources of the form of cellulose is the material known as "cotton-seed hulls," and in order to isolate it from this material the latter is first treated by any known method for isolating cellulose generally, but preferably as follows: The hulls are first heated with an alkaline solution, suitable proportions being one part, by weight, of hulls to two parts of a solution of caustic soda of three to five per cent. strength. The operation may be conducted in a digester at, say, twenty to forty pounds steam-pressure and may last for six to eight hours. The solution thus obtained is drained away from the solid matter, which should be pressed to expel as much of the liquid as possible. The fibrous residue is now exposed to the action of chlorin in suitable chambers wherein the material is distributed to avoid local action and to accelerate the process, the operation being very similar to that well known as practiced in making chlorid of lime and being continued until the orrange-yellow color of the chlorinated seed-tissues is uniform. The mass is then washed well to remove hydrochloric acid and other acid products and is digested for some time at 80° to 100° centigrade in a suitable vessel with an alkaline solution, preferably a mixture of two parts of sodium carbonate ($Na_2CO_3$) and one part of sodium sulfite ($Na_2SO_3$) dissolved in one hundred parts of water, the amount of this solution required being about three times the weight of the chlorinated product. After being thoroughly washed the material is mainly the cellulose of the cotton-seed hulls. However this cellulose is obtained, it consists chiefly of true cotton-cellulose and the hemicellulose required for this invention and having a shorter cellular structure than that of the cotton-cellulose. The shorter fibers may be separated from the cotton-cellulose by first breaking up the mass in a suitable machine, such as an edge-runner or a paper-maker's engine, and then applying some process which depends either on the greater rapidity with which the cellulose of short cellular structure settles in water or on the greater ease with which it passes through a sieve. For example, the mixture may be suspended in water and the whole run through a succession of tanks or over a paper-maker's sand table. The shorter cellulose settles first or may be collected separately, or the mixture may be treated with a stream of water directed onto a sieve—say one having meshes one-fortieth inch square—preferably kept in continuous movement. The shorter cellulose passes through and may be collected. The manufacture of a crystalline sugar from the said form of cellulose or hemicellulose may be illustrated as follows: The cellulose may be boiled with four to five times its weight of dilute sulfuric acid, preferably one containing one to three per cent. of $H_2SO_4$. The operation may be conducted in an open vessel or in shorter time and otherwise more economically in a suitable digester capable of resisting steam-pressure and constructed of acid-resisting material. The solution of sugar thus obtained is separated from any insoluble residue and neutralized with barium carbonate or chalk. After filtration from barium sulfate the solution is evaporated until the sugar crystallizes either directly or on cooling. The crystals are separated from the syrup in any known manner.

Having thus described the nature of my said invention and the best means I know of carrying the same into practical effect, I claim—

1. A process for the manufacture of a crystalline sugar from cotton-seed hulls, consisting in treating the hulls to isolate the cellulose, separating the cellulose into longer fibers and shorter fibers, hydrolyzing the said shorter fibers and crystallizing the product of hydrolysis.

2. A process for the manufacture of a crystalline sugar, consisting in subjecting cotton-seed hulls successively to the action of first an alkaline solution, second chlorin and third an alkaline solution, then separating the longer from the shorter fibers and finally hydrolyzing the shorter fibers.

3. A process for the manufacture of a crystalline sugar, consisting in subjecting cotton-seed hulls successively to the action of first an alkaline solution, second chlorin and third an alkaline solution, then breaking up the mass of cellulose produced, then suspending the broken mass in water, then collecting the portion which settles first and finally hydrolyzing this portion.

In testimony whereof I have signed my name to this specification in the presence of two subscribing witnesses.

CHARLES FREDERICK CROSS.

Witnesses:
 JOSEPH MILLARD,
 WALTER J. SKERTEN.